(12) United States Patent
Marković et al.

(10) Patent No.: US 10,907,977 B1
(45) Date of Patent: Feb. 2, 2021

(54) HUMAN-AIDED GEO-RECTIFICATION OF GEOSPATIAL METADATA IN VIDEO USING A GRAPHICAL INTERFACE

(71) Applicant: Cubic Corporation, San Diego, CA (US)

(72) Inventors: Milan Marković, Niš (RS); Zoran Ćirković, Niš (RS); Nemanja Grujić, Niš (RS); Dillon Bussert, Wilmington, NC (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/660,229

(22) Filed: Oct. 22, 2019

(51) Int. Cl.
*G01C 21/32* (2006.01)
*G06K 9/00* (2006.01)

(52) U.S. Cl.
CPC ......... *G01C 21/32* (2013.01); *G06K 9/00637* (2013.01); *G06K 9/00651* (2013.01); *G06K 9/00671* (2013.01)

(58) Field of Classification Search
None
See application file for complete search history.

(56) References Cited

U.S. PATENT DOCUMENTS

| 2003/0218674 | A1 | 11/2003 | Zhao et al. |
| 2011/0141312 | A1* | 6/2011 | Heminghous .... H04N 21/21805 348/231.5 |
| 2011/0199479 | A1* | 8/2011 | Waldman ........... G01C 21/3602 348/116 |
| 2017/0018120 | A1* | 1/2017 | Li ......................... G06T 19/006 |
| 2017/0039765 | A1* | 2/2017 | Zhou ......................... G06T 7/55 |

FOREIGN PATENT DOCUMENTS

WO 2015181827 A1 12/2015

* cited by examiner

*Primary Examiner* — Lindsay J Uhl
(74) *Attorney, Agent, or Firm* — Kilpatrick Townsend & Stockton, LLP

(57) ABSTRACT

Embodiments disclosed herein provide a graphical user interface in which a user can quickly correct geospatial metadata accompanying a live video feed. More specifically, the graphical user interface can allow a user to quickly correlate one or more locations in the underlying video to one or more locations within the map data, thereby "anchoring" locations in the map data with locations in the video feed. These locations can then be used to correct the displayed alignment between the map information and video feed, as well as correct the geospatial metadata itself. Furthermore, tracking algorithms can be used to track the correlated locations, foregoing the need to provide manual correction for every frame of video.

19 Claims, 9 Drawing Sheets

HUMAN-AIDED GEO-RECTIFICATION OF GEOSPATIAL METADATA IN VIDEO USING A GRAPHICAL INTERFACE

BACKGROUND

Many military and civilian applications, such as governmental surveys or military surveillance, use video feeds in which map information is overlaid on a video stream of a geographical area. This can provide a viewer with an enhanced video comprising a combined visualization that can be critical in decision making. In real-time video streaming applications, for example, this can help decision makers quickly make accurate, informed decisions based on real-time events occurring at or near the geographical area captured in the video feed.

Accurately overlaying map information onto the underlying video feed can be difficult, however. The video feed may be embedded with geospatial metadata used to determine how to overlay the map information with the underlying video stream. But the sensor information from which the geospatial metadata is derived may be inaccurate due to sensor miscalibration and/or other errors. These errors can be reflected in the geospatial metadata and can ultimately lead to misalignment of the map information with the underlying video feed, which can cause confusion among decision makers viewing the combined visualization.

BRIEF SUMMARY OF THE INVENTION

Embodiments disclosed herein address these and other concerns by providing a graphical user interface in which a user can quickly correct the geospatial metadata. More specifically, the graphical user interface can allow a user to quickly correlate one or more locations in the underlying video to one or more locations within the map data, thereby "anchoring" locations in the map data with locations in the video feed. These locations can then be used to correct the displayed alignment between the map information and video feed, as well as correct the geospatial metadata itself. Furthermore, tracking algorithms can be used to track the correlated locations, foregoing the need to provide manual correction for every frame of video.

An example method of rectifying geospatial metadata associated with a video feed, according to this disclosure, comprises receiving, at a computing device, a video feed comprising a plurality of images of a geographical area, and obtaining map data, based at least in part on received metadata associated with the video feed, wherein the received metadata associated with the video feed is indicative of coordinates of the geographical area and the map data comprises location information regarding one or more physical features within the geographical area. The method further comprises causing a display to show the video feed with a graphical representation of each of the one or more physical features overlaid thereon, based on the location information, and, subsequent to causing the display to show the video feed with the graphical representation of each of the one or more physical features overlaid thereon, receiving user input correlating one or more locations of the map data to one or more respective locations of the geographical area. The method also comprises correcting an alignment of the graphical representation of at least one physical feature of the one or more physical features with the video feed, based at least in part on the user input, and outputting corrected metadata, based at least in part on the user input.

An example computer system for rectifying geospatial metadata associated with a video feed, according to this description, includes a communications subsystem, a memory, and one or more processors communicatively coupled with the communications subsystem and the memory. The one or more processors are configured to cause the computer system to receive, via the communications subsystem, a video feed comprising a plurality of images of a geographical area, and obtain map data, based at least in part on received metadata associated with the video feed, wherein the received metadata associated with the video feed is indicative of coordinates of the geographical area and the map data comprises location information regarding one or more physical features within the geographical area. The one or more processors are further configured to cause the computer system to cause a display to show the video feed with a graphical representation of each of the one or more physical features overlaid thereon, based on the location information, and, subsequent to causing the display to show the video feed with the graphical representation of each of the one or more physical features overlaid thereon, receive user input correlating one or more locations of the map data to one or more respective locations of the geographical area. The one or more processors are also configured to cause the computer system to correct an alignment of the graphical representation of at least one physical feature of the one or more physical features with the video feed, based at least in part on the user input, and output corrected metadata, based at least in part on the user input.

An example non-transitory computer-readable medium, according to this description, includes instructions stored thereby to rectify geospatial metadata associated with a video feed. The instructions, when executed by one or more processors, cause the one or more processors to receive a video feed comprising a plurality of images of a geographical area, and obtain map data, based at least in part on received metadata associated with the video feed, wherein the received metadata associated with the video feed is indicative of coordinates of the geographical area and the map data comprises location information regarding one or more physical features within the geographical area. The instructions, when executed by the one or more processors, further cause the one or more processors to cause a display to show the video feed with a graphical representation of each of the one or more physical features overlaid thereon, based on the location information, and, subsequent to causing the display to show the video feed with the graphical representation of each of the one or more physical features overlaid thereon, receive user input correlating one or more locations of the map data to one or more respective locations of the geographical area. The instructions, when executed by the one or more processors, also cause the one or more processors to correct an alignment of the graphical representation of at least one physical feature of the one or more physical features with the video feed, based at least in part on the user input, and output corrected metadata, based at least in part on the user input.

Embodiments may provide one or more advantages over traditional techniques for correcting geospatial metadata in a video feed. For example, by providing a simple user interface in which a human user can provide corrections, embodiments may utilize hardware requiring far less processing power than solutions employing machine learning or other automated techniques, ultimately providing a lower-cost solution that can be implemented on a wider variety of equipment. By using tracking algorithms to maintain the anchor points between the map information and video across successive images in the video, embodiments can maintain accuracy in the geospatial metadata without requiring a user to provide correction for each image. And the simplicity and speed in which embodiments allow a user to correct geospatial metadata mean that corrections can be made in real-time environments. Embodiments described herein can provide these and/or other advantages.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the scope.

Figure 1:
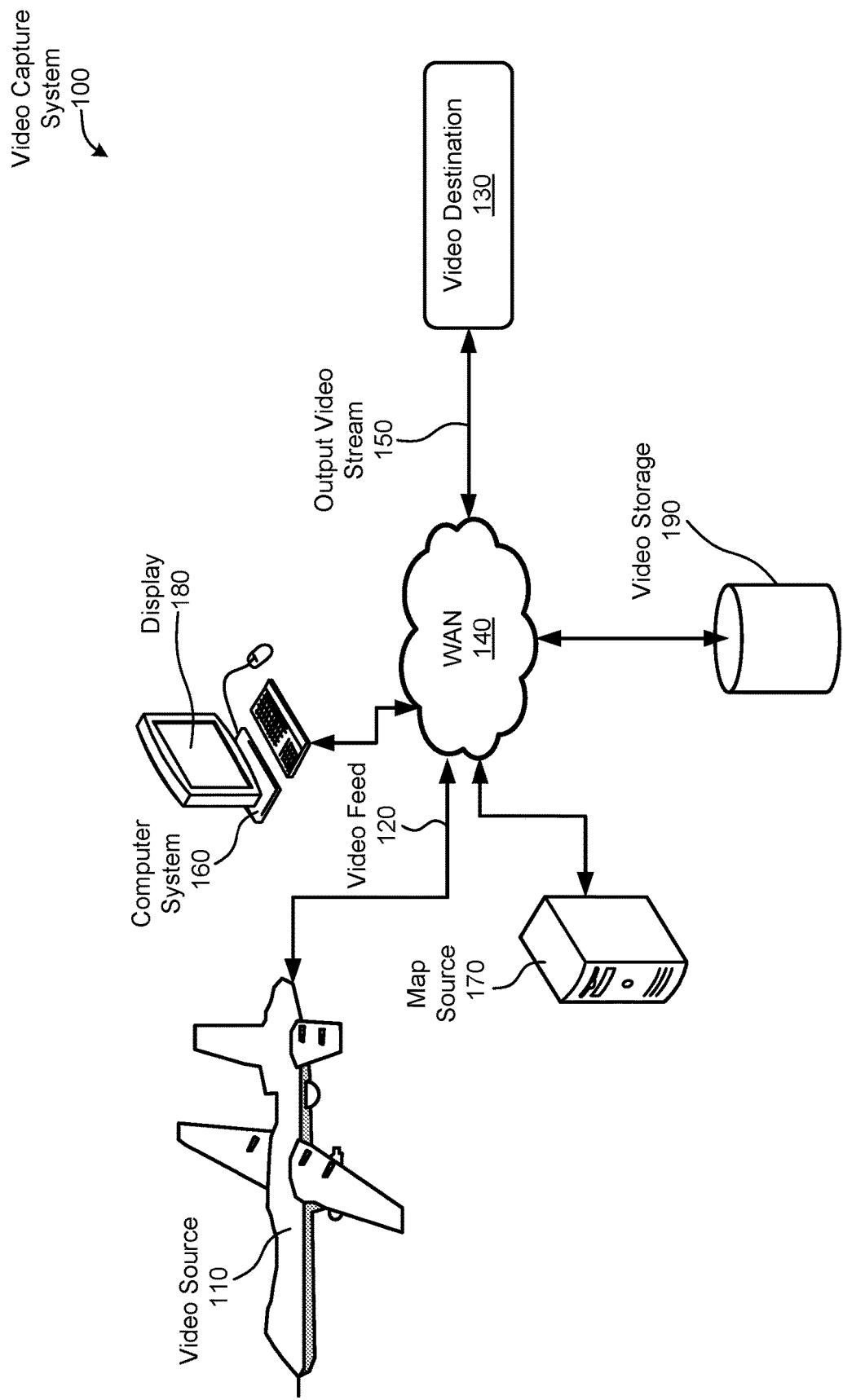
FIG. 1 is a simple diagram of a video capture system, according to an embodiment.

FIG. 1 is a simple diagram of a video capture system 100, according to an embodiment. Arrows represent communication links, which may be enabled using any of a variety of wireless and/or wired communication technologies. As will be appreciated, these technologies may communicate information in accordance with governing standards and/or protocol.

Here, a video source 110 may comprise a moving vehicle, such as an airplane, drone, or the like. Using a camera and other onboard electrical components, the video source 110 is able to capture video of the geographical area and transmit the video feed 120 (e.g., via wireless radio frequency (RF) communication) ultimately to a video destination 130 for analysis. Depending on the application, this video destination 130 may comprise a command center, operations room, control outpost, or the like. Moreover, the video feed 120 may be sent to the video destination 130 in real time, or substantially real-time, to allow for a substantially real-time analysis of the video at the video destination 130. The video destination 130 may comprise one or more video players and/or geospatial tools to enable analysis of the video.

As illustrated, the video feed 120 may be relayed to the video destination 130 through a wide area network (WAN) 140. The WAN 140 may comprise one or more public and/or private data communication networks, including the Internet, one or more cellular, radio, or other wireless WANs (WWANs), and/or the like. The WAN 140 can then provide the output video stream 150 to the video destination 130 for analysis. (As described in more detail below, embodiments provide for correction of many of data in the video feed 120. And thus, the output video stream 150 may vary from the video feed 120.)

As noted, one or more sensors at the video source 110 may be used to create metadata indicative of the location of the geographical area captured in the video. More specifically, this metadata, referred to herein as "geospatial metadata" may provide geographical coordinates of one or more features within the frame of the video, or provide for the determination of such coordinates. Accordingly, geospatial metadata may comprise raw sensor data and/or data derived therefrom. The sensor data can include information obtained from sensors such as a Global Navigation Satellite System GNSS) receiver (e.g., a Global Positioning System (GPS) receiver), magnetometer, altimeter, gyroscope, accelerometer, and/or the like, and may be generally indicative of a location of the video source 110, as well as the elevation and orientation of a camera capturing video. According to some embodiments, the sensor data may be embedded into the video feed 120 in accordance with governing standards and protocols. For example, the Motion Imagery Standards Board (MISB) standard 0601 is one such standard indicating how sensor data may be embedded into the video (e.g., as a real time, synchronous MISB key-length-value (KLV) stream). Alternative embodiments may use additional or alternative standards, depending on desired functionality. But due inherent measurement errors and non-linear transformations involved in calculating the frame four corner position on the ground (FCI), the resulting geospatial metadata of the video feed 120, may not be precise enough for some applications.

According to embodiments, a computer system 160 can be used to correct the geospatial metadata of the video feed 120. (This correction of geospatial metadata is also referred to herein as "geo-rectification" of the metadata.) To do so, the computer system 160 can retrieve map information from a map source 170, based on the geospatial metadata in the video feed 120, and show a graphical representation of one or more physical features in the map information on a display 180, overlaid onto the video from the video feed 120. Because the location of the graphical representation of the physical features will be based on the geospatial metadata of the video feed 120, the user will be able to see any misalignment of said features. And as described in more detail below, the user can use the computer system 160 to quickly correct the geospatial metadata by aligning the map information with the video. Corrected geospatial metadata can be determined based on this user input, and included with the output video stream 150 to the video destination 130. In this way, the computer system 160 can be used to "intercept" the video feed 120 and correct its geospatial metadata, ultimately providing corrected geospatial metadata with the output video stream 150 to the video destination 130.

It can be noted that alternative embodiments may vary from the embodiment of a video capture system 100 illustrated in FIG. 1. For example, in some embodiments, the computer system 160 itself may be the video destination 130. That is, the techniques for geo-rectification provided herein may be used at a computer system 160 that may also be used for analysis of the video feed 120. In addition or as an alternative to providing the output video stream 150, the corrected geospatial metadata may be stored along with the video in video storage 190. In some embodiments, the video storage 190 may be local to or remote from the computer system 160, and may be accessible by the video destination 130 sometime after the video is stored, allowing for video with corrected geospatial metadata to be played after the initial capture of the video and correction of the geospatial metadata.

The map source 170, too, may vary, depending on desired functionality. In some embodiments, the map source 170 may be local to the computer system 160. In other embodiments, the map source may be a public or private map database remote from the computer system 160, and may be accessible via the Internet (which may be part of WAN 140).

FIGS. 2-7 are example images that can be shown on a graphical user interface on the display 180 of a computer system 160 to allow a user to quickly identify and correct problems in the geospatial metadata of the video feed 120.

Figure 2:
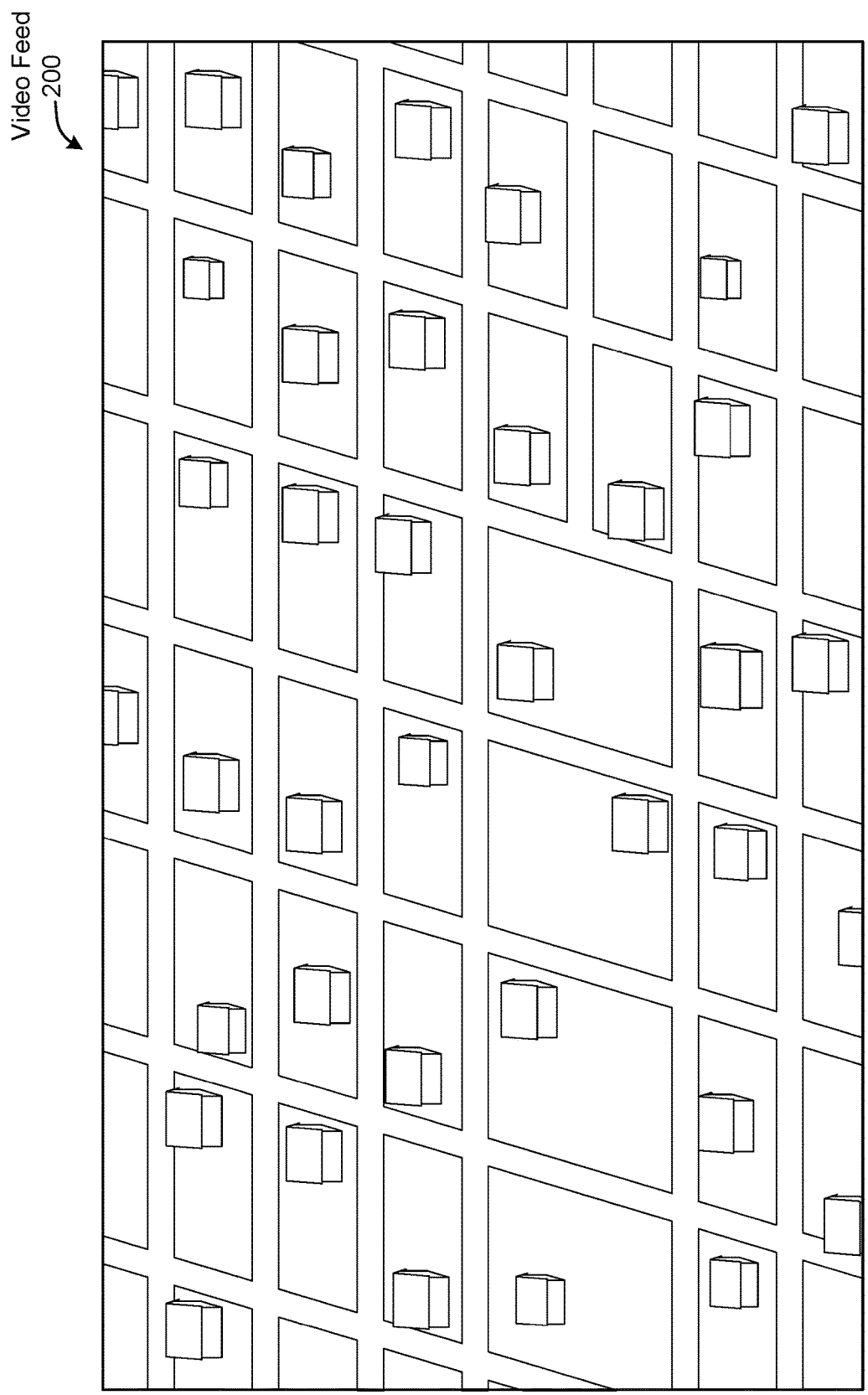
FIG. 2 is an illustration of an example video feed, according to an embodiment.

FIG. 2 is an illustration of an example video feed, according to an embodiment, showing an angled overhead view of a geographical area comprising a grid of city streets. As noted, the video feed may be captured at a video source 110 comprising a drone, airplane, etc. Sensors on the video source 110 can be used to capture geospatial metadata about the geographical area, which can be embedded in the video feed. In some embodiments, for example, the geospatial metadata may comprise geographical coordinates corresponding to a center and/or the four corners of the video feed 200. This video feed can be provided to a computer system 160 to provide the geo-rectification according to embodiments described herein.

Figure 3:
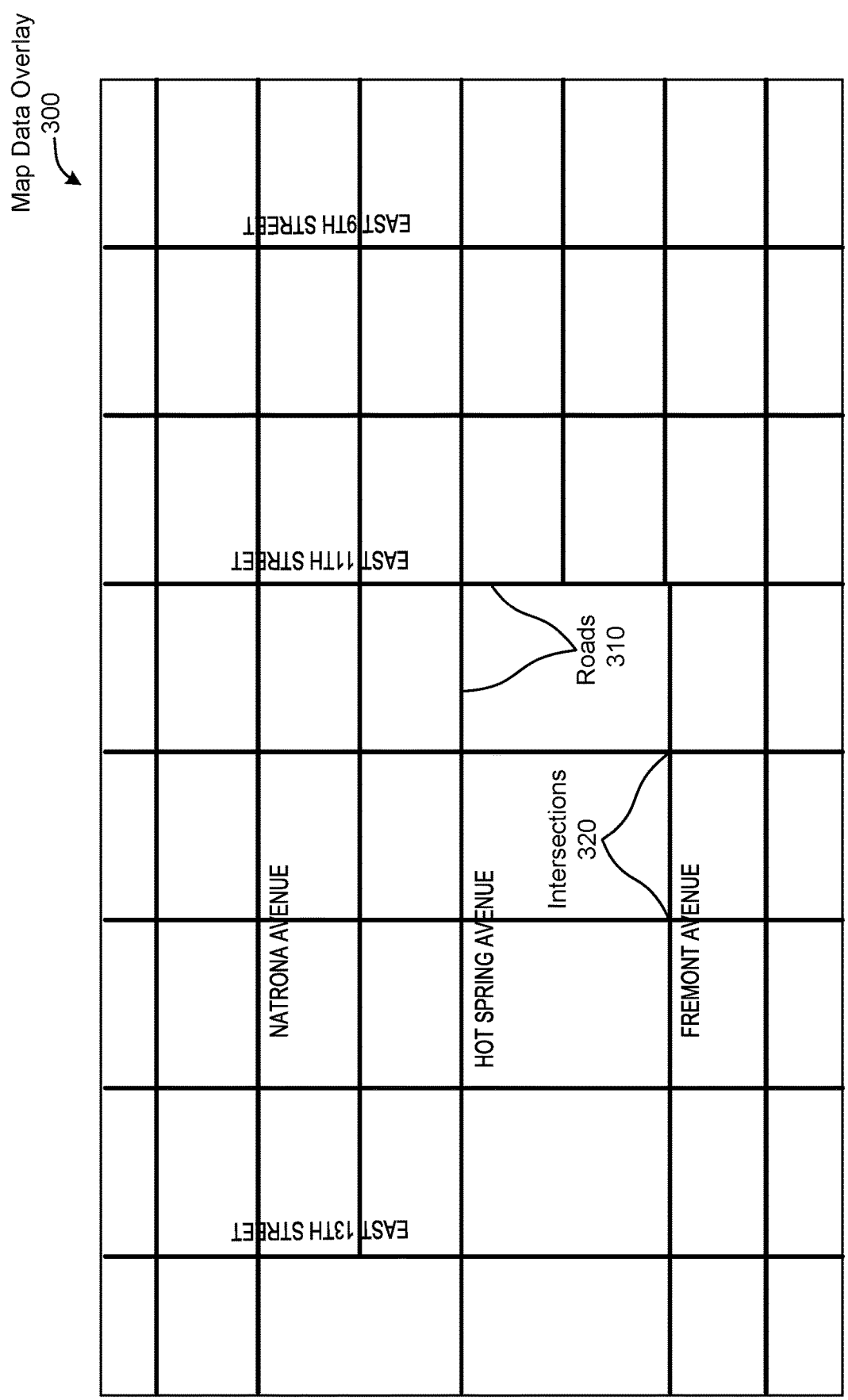
FIG. 3 is an illustration of an example map data overlay, corresponding to the geographical area of the video feed of FIG. 2.

FIG. 3 is an illustration of an example map data overlay 300, corresponding to the geographical area of the video feed 200 of FIG. 2. The map data overlay 300 is a graphical representation of map information obtained by the computer system 160 from the map source 170. As illustrated, the map data overlay 300 may comprise graphical features corresponding to physical features in the geographical area, such as roads 310 and intersections 320. (To avoid clutter, only a small portion of roads 310 and intersections 320 are labeled in FIG. 3.) Depending on desired functionality, available map information, and/or other factors, graphical representations of other types of physical structures in the geographical area may be depicted additionally or alternatively.

The map data used by the computer system 160 to create the map data overlay 300 can be based on the geospatial metadata accompanying the video feed 200 of FIG. 2. That is, the computer system 160 may obtain one or more coordinates (or other location information) from the geospatial metadata for an image within the video feed to determine the geographical area falling within the frame of that image. The computer system 160 can then retrieve the map data relevant to the geographical area and create the map data overlay 300, which he can then overlay on top of the video feed 200, as shown in FIG. 4.

Figure 4:
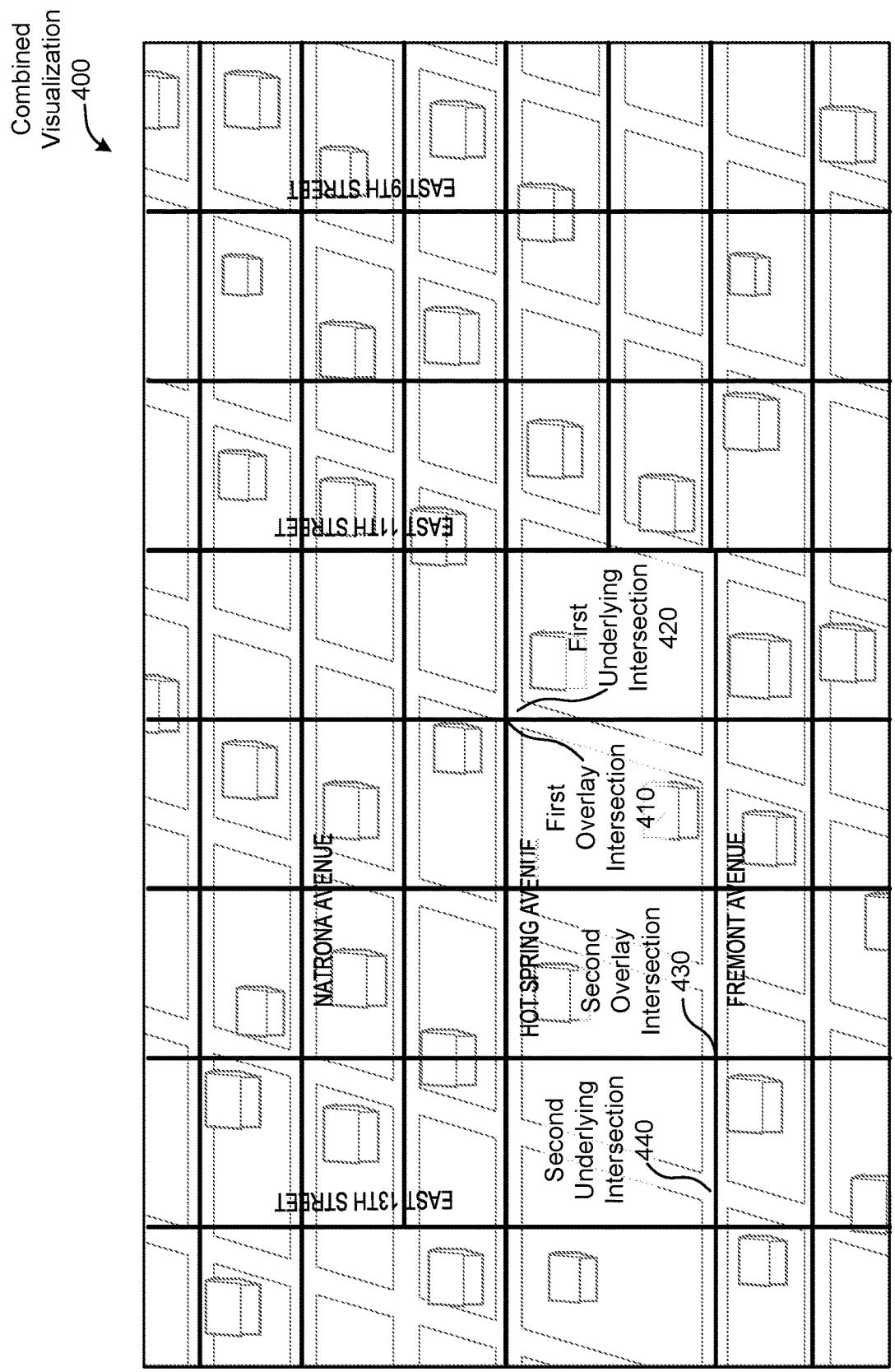
FIG. 4 is an illustration of an example combined visualization, in which the map data overlay of FIG. 3 is overlaid on the video feed of FIG. 2 to provide an enhanced video feed.

FIG. 4 is an illustration of an example combined visualization 400, in which the map data overlay 300 of FIG. 3 is overlaid on the video feed 200 of FIG. 2, providing an enhanced video feed. The computer system 160 can provide this combined visualization 400 on a display 180 to allow a user to identify and correct errors in the geospatial metadata, according to embodiments. According to some embodiments, the combined visualization 400 may comprise live video or delayed video stream from the underlying video feed, with a dynamically-updated map data overlay to match changes in the video feed, thereby resulting in a dynamic combined visualization 400 that may change as the underlying video feed changes.

As can be seen in the example illustrated in FIG. 4, the various graphical features of the map data overlay 300 are misaligned with corresponding features in the underlying video feed 200. Specifically, the map data overlay 300 is misaligned with regard to rotation, and, to a lesser degree, translation and scaling.

According to embodiments, the user can identify the misalignment in the combined visualization 400 shown on the display 180 of the computer system 160, then use the computer system to correct the misalignment. This can be done by correlating one or more locations in the map data overlay with corresponding location in the underlying video, thereby "anchoring" the map data to the video at these locations. These correlated locations are referred to herein as "control points." The more control points that are made by the user, the more the misalignment between the map data overlay and underlying video feed will be reduced. Moreover, the computer system 160 can then correct the geospatial metadata based on a corrections made by the control points.

As an example, the graphical user interface of the display 180 may allow the user to create a first control point by selecting a first overlay intersection 410, then selecting a first underlying intersection 420 with which to associate the first overlay intersection 410. In response, the computer system 160 can immediately translate the map data overlay accordingly, such that first overlay intersection 410 is "anchored" to the first underlying intersection 420. Further, based on this information, the computer system 160 can then generate corrected geospatial metadata that can be sent with the output video stream 150 to the video destination 130.

Selection may be made in any of a variety of ways, according to desired functionality. For example, for a computer system 160 in which the user interacts using a mouse, the user may be able to click the first overlay intersection 410, then click the first underlying intersection 420 (or vice versa). Additionally or alternatively, a user might "drag-and-drop" the first overlay intersection 410 onto the first underlying intersection 420. In some embodiments, the video feed may be frozen (paused) during this interaction, to make the correction easier. In such embodiments, if the video feed comprises live video, the video feed may then "jump forward" to live video once the user correction is input. Moreover, in some embodiments, icons with which the user can interact with the GUI may be enlarged if a cursor comes within a threshold distance of them, to show interactability. If the display 180 comprises a touchscreen, touch inputs may be used to provide user correction. A person of ordinary skill in the art will appreciate the various types of user input that may be used in alternative embodiments to create control points.

Continuing with the example, the user may then select a second overlay intersection 430 and correlate it to a second underlying intersection 440. In this manner, using to or more control points, a user can reduce rotational and scaling misalignment between the map data overlay and underlying video feed. The creation of the control points may be done in real time or substantially real-time. Because this can be done quickly with little effort by the user, it can have significant advantages over traditional systems that require a user to make corrections by manually entering coordinates of certain predefined points (e.g., corners) of the video feed, or require high amounts of processing power to employ automated correction through machine learning.

Figure 5:
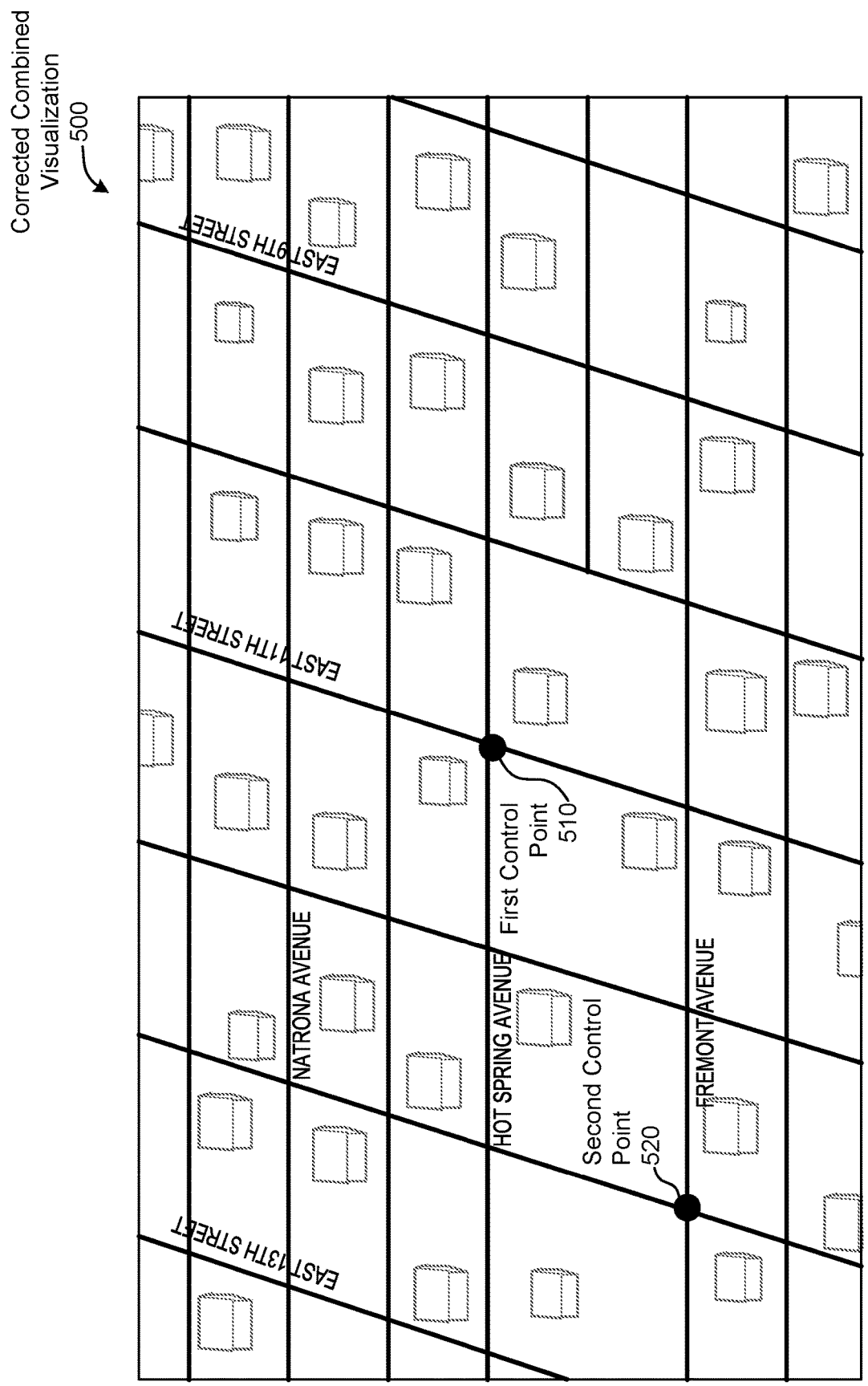
FIG. 5 is an illustration a corrected combined visualization, according to an embodiment.

FIG. 5 is an illustration the corrected combined visualization 500, provided in the display 180 of the computer system 160, in which the map data overlay of the combined visualization 400 has been corrected using a first control point 510 and a second control point 520. According to some embodiments, these control points may be highlighted, labeled, and/or identified as by other means in the corrected combined visualization 500. As can be seen, some residual misalignment may remain. However, depending on the type of algorithms use, the algorithm may choose to provide a "best match" of the map data overlay and underlying video feed with a given set of control points.

Different algorithms can be employed to correct the overlay shown in the corrected combined visualization 500 and/or correct the geospatial metadata of the video feed correspondingly.

As noted, embodiments may employ tracking mechanisms to track changes in successive images in the video feed and update the corrected combined visualization 500 accordingly. That is, according to some embodiments, the computer system 160 can use image processing techniques to identify and track features within successive images. In some embodiments, for example, tracking techniques may classify regions of images as moving objects, and extracts features within the regions to map between successive images. These features can then be classified as static or moving. Other embodiments may use additional or alternative tracking techniques, as a person of ordinary skill in the art will appreciate.

Tracking between successive images and video feed can allow the computer system 160 to keep control points at the correct locations in the underlying video feed as video and the video feed undergoes translational, rotational, and/or scaling changes. Because the computer system 160 can automatically maintain these control points in the corrected combined visualization 500 for long portions of the video feed, embodiments using such tracking techniques can significantly reduce the amount of work required of the user to maintain the alignment of the map data overlay with the underlying video feed.

According to some embodiments, tracking may be conducted using information in frames of the video feed to infer relative camera motion by calculating frame to frame homographies. A homography is a linear projective transformation that relates coordinates in two images under perspective transformations, and can be written as follows:

$$\begin{pmatrix} x' \\ y' \\ w' \end{pmatrix} = \begin{pmatrix} h_{11} & h_{12} & h_{13} \\ h_{21} & h_{22} & h_{23} \\ h_{31} & h_{32} & h_{33} \end{pmatrix} \begin{pmatrix} x \\ y \\ 1 \end{pmatrix}. \quad (1)$$

Differently written, model parameters $h_{11}$-$h_{33}$ map coordinates in one referent system $(x, y)^T$ to coordinates in the other $(x'/w', y'/w')^T$. This model may be used in some embodiments to describe both frame-to-frame mapping and frame-to-GPS coordinate mapping.

To robustly estimate homographies between consecutive frames feature-based homography estimation can be employed. More specifically, Maximal Stable Extremal Regions (MSER) detections in each frame can be assigned a feature vector describing detection's area, statistical moments, and other information later used to match detections with corresponding detections from other frames.

After the correspondence between detections is made, a multiple-frame (e.g., 30-frames) motion analysis can be conducted to separate moving objects from static features on the ground. This filtered subset can be used in an iterative method for robust homography estimation. For example, the RANdom SAmple Consensus (RANSAC) algorithm can be used to calculate optimal homography parameters accounting for possible outliers (mismatches) produced in the matching phase. This can creates a stable stream of homographies between video frames, allowing us to track pixel coordinates over a large span of frames.

Embodiments in which the frame-to-frame homographies are constantly streaming from our tracker using these tracking techniques can then incorporate a user-generated correction made in a past from to a current frame. That is, when a user correction is received, correlating a point in a map data overlay 300 to a point in the underlying video feed for some past frame of video, this correction can be mapped to the current frame, and the rest of the calculation can be performed in that frame of reference. In a similar manner, corrections made in the other previous frames will be mapped to the referent frame.

For example, the point correspondence information containing corresponding pixel and geographical (geo) coordinates can be represented as follows:

$$Frame_1: (x_1^{fr}, y_1^{fr}, x_1^{geo}, y_1^{geo}) \quad (2)$$
$$Frame_k: (x_k^{fr}, y_k^{fr}, x_k^{geo}, y_k^{geo}).$$

These can be mapped using frame-to-frame homography to the current frame, represented as:

$$Frame_n: c_1 = H_{1n}\vec{x}_1 \quad (3)$$
$$Frame_n: c_k = H_{1n}\vec{x}_k,$$

where $H_{1n}$ denotes a homography mapping between frame 1 and frame n, and $$H = \begin{pmatrix} a_1 & a_2 & t_x \\ a_l & a_2 & t_x \\ p_1 & p_2 & 1 \end{pmatrix}. \quad (4)$$

With each user-defined correspondence pair a system of two equations can be constructed. According to embodiments, a full projective model may have eight degrees of freedom, thereby requiring at least four non-collinear correspondence pairs to be calculated.

As previously noted, to allow for better interactivity, including graphical user interface feedback as each point is being defined, the model can be adapted to the data available. If only one correspondence pair is available, only translation parameters ($t_x$, $t_y$) may be calculated. Two points allow for Translation-Rotation-Zoom (calculating tx, ty and a reduced subset of possible $a_i$ parameters). Three points allow for affine transformation, while four or more points define full projection.

The final homography may be mapped using the following equation:

$$H_{geo} = H_{correction} H_{klv} \qquad (5)$$

Where $H_{geo}$ is the final homography mapping the current frame's pixels to geo coordinates, $H_{klv}$ is the frame-to-geo coordinates mapping calculated from existing metadata, and $H_{correction}$ is the correction to metadata being calculated.

Correspondences ($c_i, x_i^{geo}$) that were mapped to the referent frame can undertake another transformation, where the frame coordinates $c_i$ our mapped to geo coordinates using $H_{klv}$. This defines a set of correspondence pairs ($x_i^{klv}, x_i^{geo}$) that are used to calculate $H_{correction}$.

The varying set of model parameters (model DoF selection depends on the number of correspondences, as defined above) may be calculated using direct linear transformation (DLT) from point correspondences directly. The resulting matrix may then be used to interactively update the scene as the user is moving the control point across the screen. This can give the user direct feedback of their actions, allowing them to make decisions quickly.

It can be noted that, although intersections are used to create control points in the example illustrated in FIGS. 4-5, embodiments are not so limited. Embodiments may allow a user to create a control point anywhere by "anchoring" any point in the overlay to any point in the underlying video feed. In some embodiments, in fact, a user may not need to select a graphical representation (e.g., road or intersection) in the map data overlay to anchor it to a location in the underlying video feed. An example of a control point at a location other than an intersection is provided in FIGS. 6-7.

Figure 6:
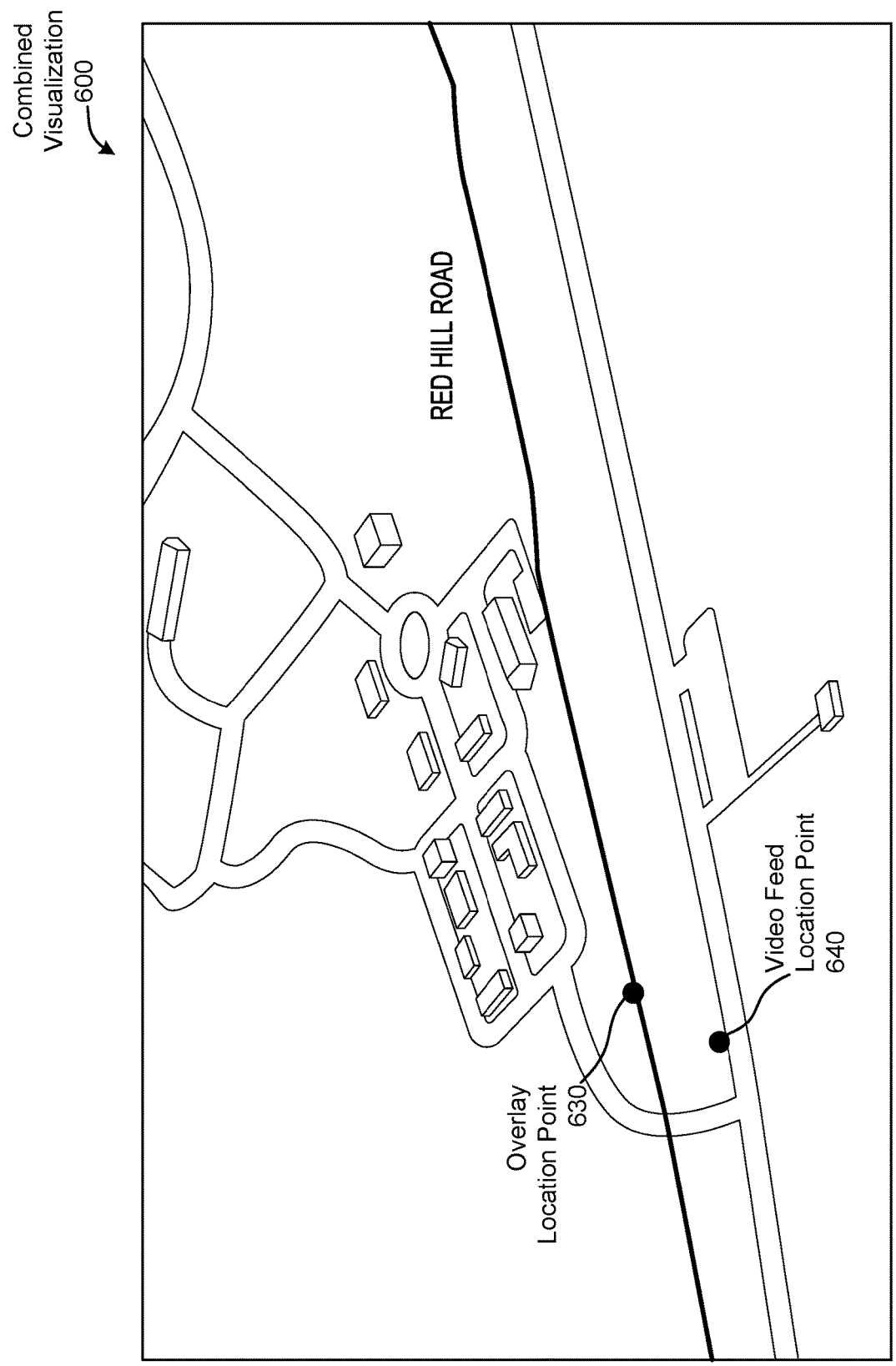
FIG. 6 is an illustration of an example combined visualization, according to an embodiment.

FIG. 6 is a combined visualization 600 similar to the combined visualization 400 of FIG. 4. Here, however, the geographical area of the video feed is not of a grid of city streets. Instead, the geographical area captured in images of the video feed show a few buildings, trees, and roads. As can be seen around the perimeter of the video feed, additional information may be provided within the combined visualization 600. This additional information may be used for analysis at a video destination 130, but may not necessarily be used for geo-rectification.

In this example, the map data overlay includes only a graphical representation of only a single physical feature. The graphical representation, the road in overlay 610, corresponds with the road in video feed 620. As can be seen, there is an translational offset between the road in overlay 610 and road in video feed 620, which is reflective of an offset in the geospatial metadata accompanying the underlying video feed. As described in the embodiment above, the user can correct this offset by selecting a location point in the map data overlay, then selecting a corresponding location point in the underlying video feed (or vice versa) creating a control point that anchors the location in the map data overlay with the corresponding location in the video feed. As an example, if the user selects the overlay location point 630 (and arbitrarily chosen point in the map data overlay) and anchors it to the video feed location point 640 (representing the corresponding point in the underlying video feed), it creates a corresponding control point, as illustrated in FIG. 7.

Figure 7:
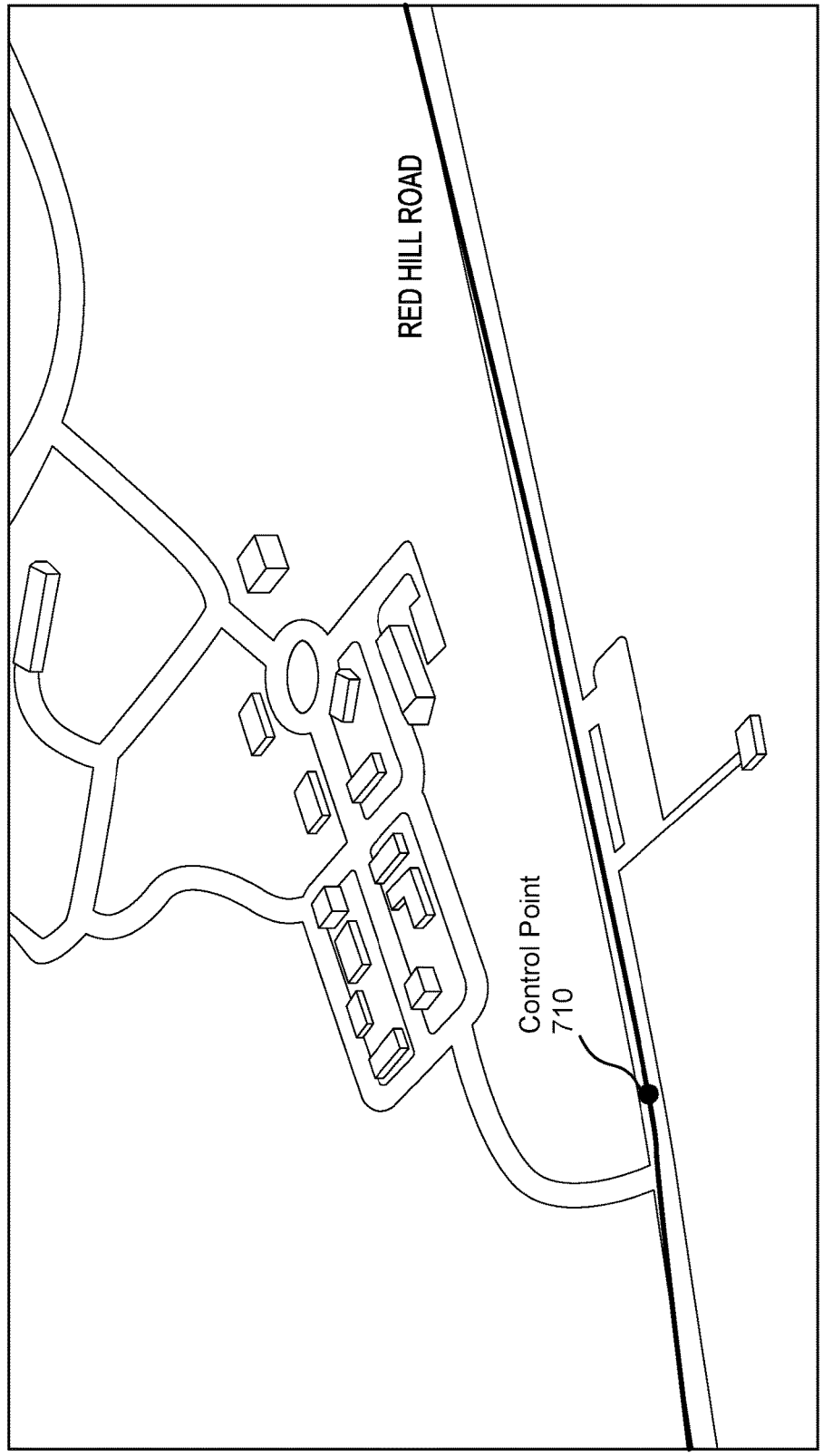
FIG. 7 is an illustration of the combined visualization of FIG. 6, as corrected using the techniques provided herein, according to an embodiment.

FIG. 7 is a corrected combined visualization 700, illustrating how the combined visualization 600 has been corrected by setting a control point 710. Here, the alignment of graphical features from the map data may be sufficient so that additional control points are not needed. (That said, a user may create additional control points in the corrected combined visualization 700, if desired.) Again, geospatial metadata associated with the underlying video feed can then be corrected based on the correlation between the overlay location point 630 and the video feed location point 640 (shown in FIG. 6) used to create the control point 710. Accordingly, embodiments may allow for the correction of geospatial metadata using as little as a single control point 710 in a stream of video (maintained through tracking, as described above) rather than requiring four manual user inputs per frame (e.g., designating the coordinates of each corner of the frame) as needed in traditional geospatial metadata correction techniques. As noted, embodiments may therefore enable geospatial metadata correction for real-time video feeds.

Figure 8:
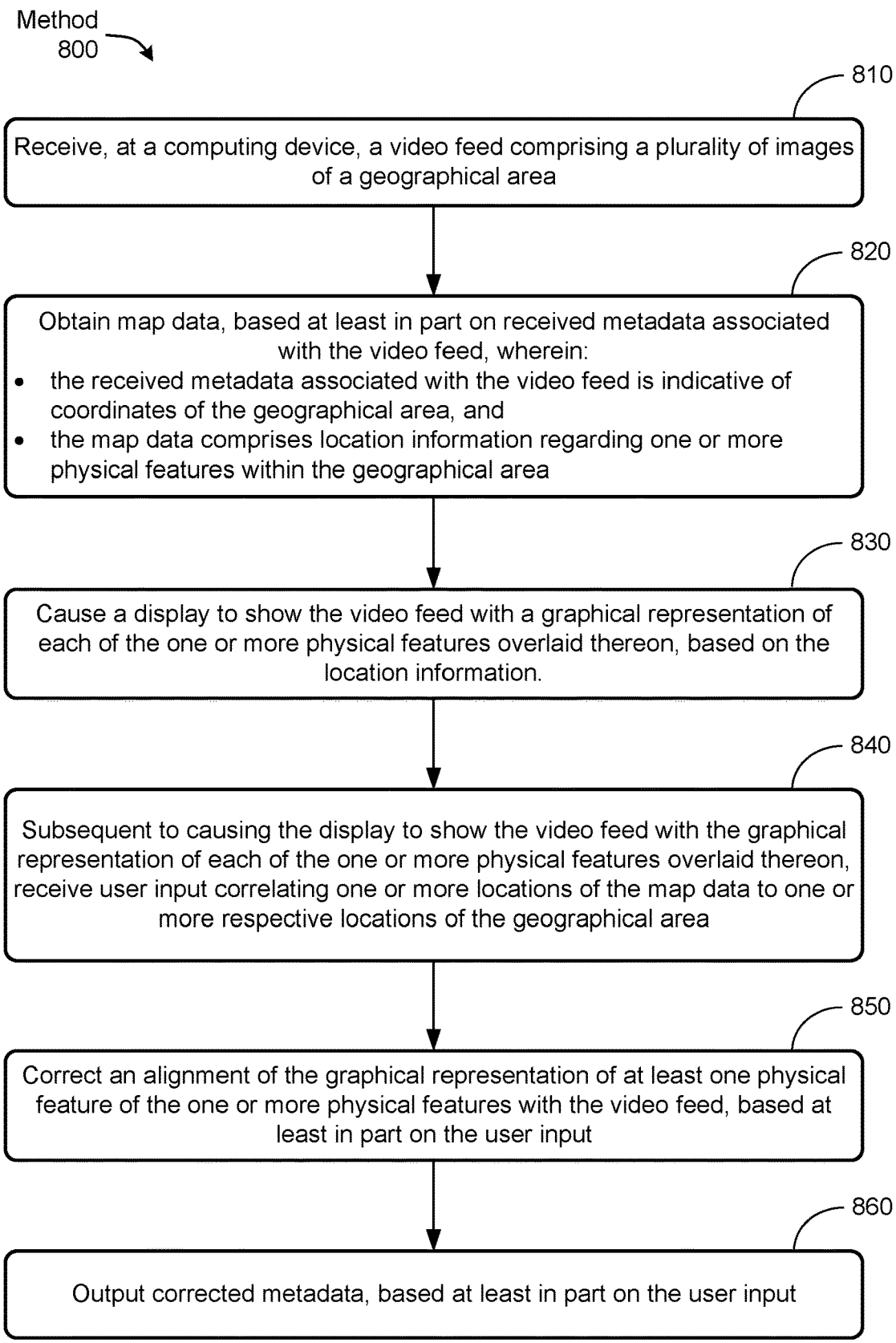
FIG. 8 is a flow diagram of a method of rectifying geospatial metadata associated with a video feed, according to an embodiment.

FIG. 8 is a flow diagram of a method 800 of rectifying geospatial metadata associated with a video feed, according to an embodiment. Means for performing the functionality shown in one or more of the blocks in FIG. 8 may comprise hardware and/or software means of a computer system, such as the computer system 160 described in FIG. 1. Such hardware and/or software components are described in more detail in FIG. 9.

The functionality at block 810 comprises receiving, at a computing device, a video feed comprising a plurality of images of a geographical area. As indicated in the embodiments described above, the geographical area may include an overhead view of any of a variety of types of geographical locations, including locations having roads, buildings, or other man-made features. That said, embodiments are not so limited, and may include images of a geographical area without man-made features, but with other physical features.

At block 820, the functionality comprises obtaining map data, based at least in part on received metadata associated with the video feed. Further, the received metadata associated with the video feed is indicative of coordinates of the geographical area, and the map data comprises a location information regarding one or more physical features within the geographical area. As noted above, the metadata may comprise geospatial metadata embedded within the video feed itself. That said, in some embodiments, the metadata may be obtained through a separate feed, depending on desired functionality.

The metadata itself may also vary, depending on the desired functionality. In some embodiments, the metadata may comprise raw sensor information obtained at a video source. This information may be used to determine where the camera capturing the images is located, and how it is oriented, enabling coordinates of the geographical area to be determined. Additionally or alternatively, the metadata may include coordinates (e.g., coordinates of the four corners of each image/frame) of the geographical area.

Map data may comprise data regarding the geographical area, obtained from a data source local to and/or remote from the computer system. As illustrated in the embodiments above, the one or more physical features for which the map data comprises location information may include roads and intersections. That said, embodiments are not so limited. Physical features may further include buildings and other man-made structures, and/or natural physical features, such as rivers, lakes (and/or other bodies of water), mountain peaks, etc. The types of physical features provided may vary, depending on the source of the map data.

At block 830, the functionality comprises causing a display to show the video feed with a graphical representation of each of the one or more physical features overlaid thereon, based on the location information. As shown in the combined visualizations 400 and 600 of FIGS. 4 and 6, respectively, graphical representations of physical features (roads, intersections, etc.) can be overlaid on the underlying map data to help provide additional information. This information can include names or other labels for the physical features, which may be useful at the video destination for analysis. Because the geospatial metadata included in the video feed is used to determine where the graphical representations should be overlaid on the underlying video feed, any errors in the geospatial metadata will be manifest by misalignment between the graphical features and the respective physical features in the video feed, as illustrated in FIGS. 4 and 6.

At block 840, the functionality comprises, subsequent to causing the display to show the video feed with the graphical representation of each of the one or more physical features overlaid thereon, receiving user input correlating one or more locations of the map data to one or more respective locations of the geographical area. As previously described, this could be done simply by selecting a location on the map data (which may be selected based on the graphical representations shown on the display), then a corresponding location in the video feed (or vice versa). This can create one or more control points that "anchors" each of the one or more locations in the map data to respective one or more locations in images of the video feed.

With these one or more control points, the method 800 can then proceed to block 850, where an alignment of the graphical representation of at least one physical feature of the one or more physical features with the video feed is corrected, based at least in part on the user input. Based on the number of control points, various alignment errors can be corrected. That is, correcting the alignment of the graphical representation of the at least one physical feature with the video feed may comprise translating a position of the at least one physical feature with respect to the video feed, wherein the translating is representative of a translation of the map data with respect to the received metadata, a rotation of the map data with respect to the received metadata, a scaling of the map data with respect to the received metadata, or any combination thereof.

According to some embodiments, alignment correction in this matter may automatically be maintained in subsequent video through the use of feature tracking. That is, as explained above, image processing can be performed to determine how objects move from one video frame to another, and alignment may be maintained based on this determined movement. Accordingly, the method 800 may comprise correcting the alignment of graphical representations of the at least one physical feature for successive images of the plurality of images, which may comprise tracking the one or more respective locations of the geographical area across the successive images (e.g., using image processing).

Functionality at block 860 comprises outputting corrected metadata, based at least in part on the user input. That is, in addition to creating a corrected combined visualization (e.g., as shown in FIGS. 5 and 7), geospatial metadata accompanying the video feed can be corrected, based on the control points provided by the user. This corrected geospatial metadata can then accompany and/or be embedded in corrected output video feed that is provided to a video destination (e.g., as shown in FIG. 1), stored in video storage, and/or used by user at the computer system.

Figure 9:
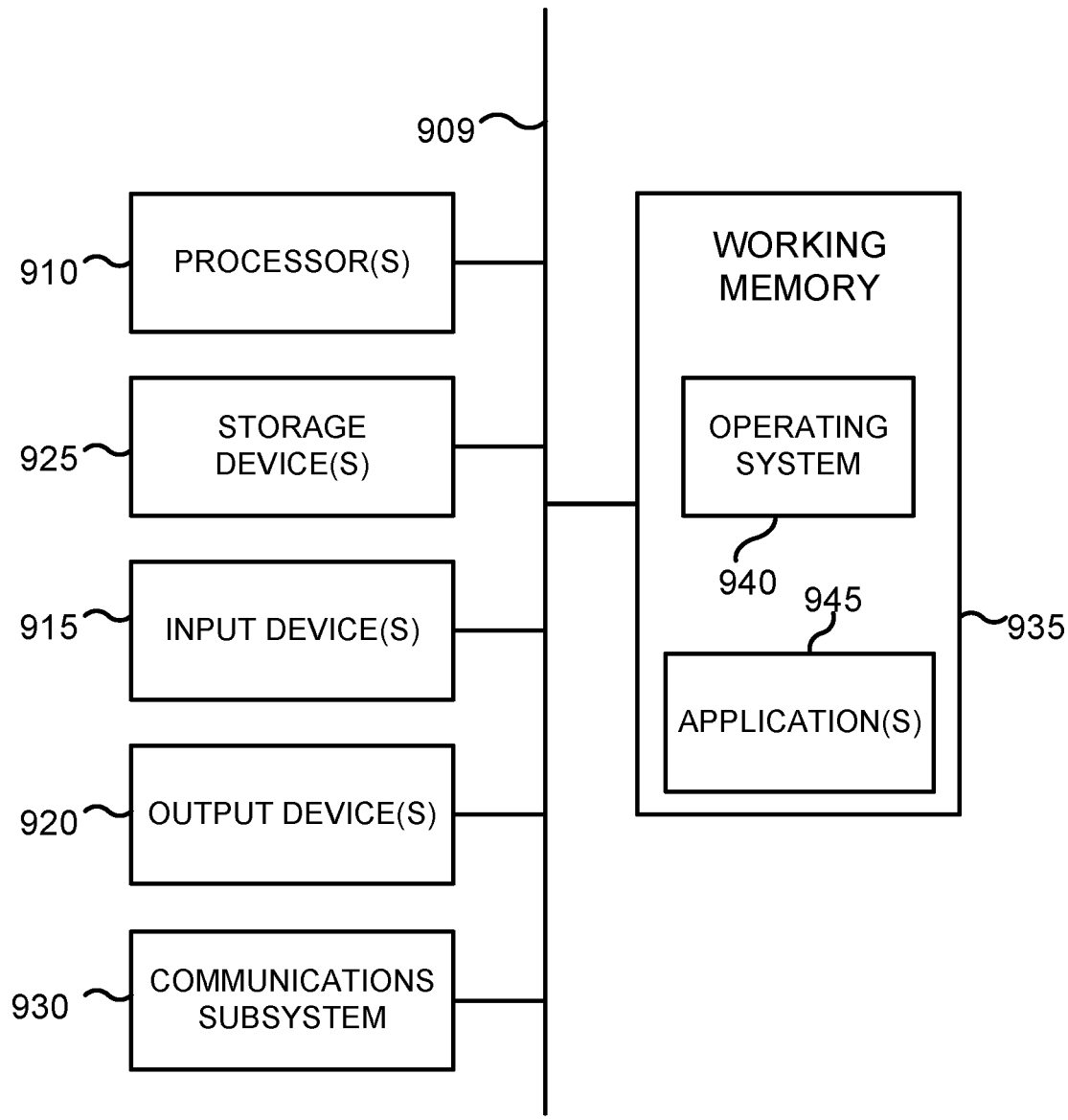
FIG. 9 shows a simplified computer system, according to some embodiments of the present disclosure.

FIG. 9 shows a simplified computer system 900, according to some embodiments of the present disclosure. A computer system 900 as illustrated in FIG. 9 may, for example, function as and/or be incorporated into the computer system 160 of FIG. 1, as well as other devices described herein, such as the video source 110, map source 170, and/or video destination 130. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors (e.g., CPUs) and/or one or more special-purpose processors such as digital signal processing chips, graphics acceleration processors (e.g., GPUs), and/or the like; one or more input devices 915, which can include without limitation a mouse, a keyboard, a camera, and/or the like; and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The computer system 900 might also include a communication interface 930, which can include without limitation a modem, a network card (wireless or wired), an infrared communication device, a wireless communication device, and/or a chipset, and/or the like. The communication interface 930 may include one or more input and/or output communication interfaces to permit data to be exchanged (e.g., via WAN 140) with other computer systems and/or any other devices described herein.

The computer system 900 also can include software elements, shown as being currently located within the working memory 935, including an operating system 940, device drivers, executable libraries, and/or other code, such as one or more application programs 945, which may comprise computer programs provided by various embodiments, and/ or may be designed to implement methods, and/or configure systems, provided by other embodiments, as described herein. Merely by way of example, all or part of one or more procedures described with respect to the methods discussed above, and/or methods described in the claims, might be implemented as code and/or instructions executable by a computer and/or a processor within a computer. In an aspect, then, such code and/or instructions can be used to configure and/or adapt a general purpose computer or other device to perform one or more operations in accordance with the described methods. Put differently, one or more processors may be configured to cause a computer system to perform one or more functions of a method by executing such code and/or instructions.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor(s) 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communication interface 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of rectifying geospatial metadata associated with a video feed, the method comprising:
    receiving, at a computing device, a video feed comprising a plurality of images of a geographical area;
    obtaining map data, based at least in part on received metadata associated with the video feed, wherein:
        the received metadata associated with the video feed is indicative of coordinates of the geographical area, and
        the map data comprises location information regarding one or more physical features within the geographical area;
    causing a display to show the video feed with a graphical representation of each of the one or more physical features overlaid thereon, based on the location information;
    subsequent to causing the display to show the video feed with the graphical representation of each of the one or more physical features overlaid thereon, receiving user selection of one or more locations of the map data and one or more respective locations of the geographical area;
    correlating the one or more locations of the map data to the one or more respective locations of the geographical area based on the user selection;
    correcting an alignment and scaling of the graphical representation of at least one physical feature of the one or more physical features with the video feed, based at least in part on the user selection and the correlating;
    computer tracking the one or more respective locations of the geographical area across successive images of the plurality of images; and
    outputting corrected metadata based at least in part on the user selection and tracking, wherein the corrected metadata is output to a device comprising a video destination or video storage separate from the display.

2. The method of claim 1, wherein:
    the received metadata is embedded in the video feed; and
    outputting the corrected metadata comprises outputting the video feed with the corrected metadata embedded therein.

3. The method of claim 1, wherein the corrected metadata comprises geographical coordinates corresponding to one or more corners of the video feed.

4. The method of claim 1, wherein correcting the alignment of the graphical representation of the one or more physical features with the video feed comprises translating a position of the one or more physical feature with respect to the video feed, wherein the translating is representative of:
    a translation of the map data with respect to the received metadata,
    a rotation of the map data with respect to the received metadata,
    a scaling of the map data with respect to the received metadata, or
    any combination thereof.

5. The method of claim 1, wherein outputting the corrected metadata to the video storage comprises storing the video feed with the corrected metadata.

6. The method of claim 1, further comprising correcting the alignment of the graphical representation of the at least one physical feature for successive images of the plurality of images.

7. The method of claim 6, wherein correcting the alignment of the graphical representation of the one or more physical features for successive images of the plurality of images comprises tracking the one or more respective locations of the geographical area across the successive images.

8. The method of claim 1, wherein the received metadata comprises sensor data obtained at a video source.

9. A computer system for rectifying geospatial metadata associated with a video feed, the computer system comprising:
    a communications subsystem;
    a memory; and
    one or more processors communicatively coupled with the communications subsystem and the memory, the one or more processors configured to cause the computer system to:
        receive, via the communications subsystem, a video feed comprising a plurality of images of a geographical area;
        obtain map data, based at least in part on received metadata associated with the video feed, wherein:
            the received metadata associated with the video feed is indicative of coordinates of the geographical area, and
            the map data comprises location information regarding one or more physical features within the geographical area;
        cause a display to show the video feed with a graphical representation of each of the one or more physical features overlaid thereon, based on the location information;
        subsequent to causing the display to show the video feed with the graphical representation of each of the one or more physical features overlaid thereon, receive user selection of one or more locations of the map data and one or more respective locations of the geographical area;
        correlate the one or more locations of the map data to the one or more respective locations of the geographical area based on the user selection;
        correct an alignment and scaling of the graphical representation of at least one physical feature of the one or more physical features with the video feed, based at least in part on the user selection and the correlated locations;
        computer track the one or more respective locations of the geographical area across successive images of the plurality of images; and
        output corrected metadata based at least in part on the user selection and tracking, wherein the corrected metadata is output to a device comprising a video destination or video storage separate from the display.

10. The computer system of claim 9, wherein:
    to receive the received metadata, the one or more processors are configured to cause the computer system to extract the received metadata from the video feed; and to output the corrected metadata, the one or more processors are configured to cause the computer system to output the video feed with the corrected metadata embedded therein.

11. The computer system of claim 9, wherein the one or more processors are configured to cause the computer system to include, in the corrected metadata, geographical coordinates corresponding to one or more corners of the video feed.

12. The computer system of claim 9, wherein, to correct the alignment of the graphical representation of the at least one physical feature with the video feed, the one or more processors are configured to cause the computer system to translate a position of the at least one physical feature with respect to the video feed, wherein the translating is representative of:
- a translation of the map data with respect to the received metadata,
- a rotation of the map data with respect to the received metadata,
- a scaling of the map data with respect to the received metadata, or
- any combination thereof.

13. The computer system of claim 9, wherein, to output the corrected metadata to the video storage, the one or more processors are configured to cause the computer system to store the video feed with the corrected metadata.

14. The computer system of claim 9, wherein the one or more processors are further configured to cause the computer system to correct the alignment of the graphical representation of the at least one physical feature for successive images of the plurality of images.

15. A non-transitory computer-readable medium having instructions stored thereby to rectify geospatial metadata associated with a video feed, the instructions, when executed by one or more processors, cause the one or more processors to:
- receive a video feed comprising a plurality of images of a geographical area;
- obtain map data, based at least in part on received metadata associated with the video feed, wherein:
  - the received metadata associated with the video feed is indicative of coordinates of the geographical area, and
  - the map data comprises location information regarding one or more physical features within the geographical area;
- cause a display to show the video feed with a graphical representation of each of the one or more physical features overlaid thereon, based on the location information;
- subsequent to causing the display to show the video feed with the graphical representation of each of the one or more physical features overlaid thereon, receive user selection of one or more locations of the map data and one or more respective locations of the geographical area;
- correlate the one or more locations of the map data to the one or more respective locations of the geographical area based on the user selection;
- correct an alignment and scaling of the graphical representation of at least one physical feature of the one or more physical features with the video feed, based at least in part on the user selection and the correlated locations;
- computer track the one or more respective locations of the geographical area across successive images of the plurality of images; and
- output corrected metadata based at least in part on the user selection and tracking, wherein the corrected metadata is output to a device comprising a video destination or video storage separate from the display.

16. The non-transitory computer-readable medium of claim 15, further comprising instructions that, when executed by the one or more processors, cause the one or more processors to:
- receive the received metadata at least in part by extracting the received metadata from the video feed; and
- output the corrected metadata at least in part by outputting the video feed with the corrected metadata embedded therein.

17. The non-transitory computer-readable medium of claim 15, further comprising instructions that, when executed by the one or more processors, cause the one or more processors to include, in the corrected metadata, geographical coordinates corresponding to one or more corners of the video feed.

18. The non-transitory computer-readable medium of claim 15, further comprising instructions that, when executed by the one or more processors, cause the one or more processors to correct the alignment of the graphical representation of the at least one physical feature with the video feed at least in part by translating a position of the at least one physical feature with respect to the video feed, wherein the translating is representative of:
- a translation of the map data with respect to the received metadata,
- a rotation of the map data with respect to the received metadata,
- a scaling of the map data with respect to the received metadata, or
- any combination thereof.

19. The non-transitory computer-readable medium of claim 15, further comprising instructions that, when executed by the one or more processors, cause the one or more processors to output the corrected metadata to the video storage at least in part by storing the video feed with the corrected metadata.

* * * * *